United States Patent
Erickson et al.

(10) Patent No.: US 10,256,617 B1
(45) Date of Patent: Apr. 9, 2019

(54) HANDHOLE ASSEMBLY

(71) Applicant: JDT CONCEPTS LLC, Staples, MN (US)

(72) Inventors: David Erickson, Crosslake, MN (US); Julian P. Trangsrud, Northfield, MN (US)

(73) Assignee: JDT Concepts LLC, Staples, MN (US)

( * ) Notice: Subject to any disclaimer, the term of this patent is extended or adjusted under 35 U.S.C. 154(b) by 0 days.

(21) Appl. No.: 15/958,763

(22) Filed: Apr. 20, 2018

(51) Int. Cl.
*H02G 9/10* (2006.01)
*E02D 29/14* (2006.01)

(52) U.S. Cl.
CPC ............. *H02G 9/10* (2013.01); *E02D 29/149* (2013.01)

(58) Field of Classification Search
CPC ................................. H02G 9/10; E02D 29/149
See application file for complete search history.

(56) References Cited

U.S. PATENT DOCUMENTS

| | | | | |
|---|---|---|---|---|
| 3,652,779 A * | 3/1972 | Grinols | ..................... | H01R 4/64 174/16.1 |
| 3,672,103 A * | 6/1972 | Kost | ........................ | H01F 27/06 137/363 |
| 4,089,139 A * | 5/1978 | Moffa | ...................... | E02D 29/12 52/169.5 |
| 4,852,757 A * | 8/1989 | Gold | ..................... | B65D 21/083 220/4.03 |
| 5,076,456 A * | 12/1991 | Geyer | .................. | B65D 90/105 220/4.26 |
| 5,603,401 A * | 2/1997 | Brunner | ................. | B65D 25/16 206/204 |
| 5,617,679 A * | 4/1997 | Meyers | .................... | E02D 29/12 220/4.26 |
| 6,484,451 B1 * | 11/2002 | Gavin | ..................... | E02D 29/12 220/4.03 |
| 6,655,093 B1 * | 12/2003 | Gavin | ..................... | E02D 29/12 220/4.26 |
| 6,881,899 B1 * | 4/2005 | Trangsrud | ................ | H02G 9/10 174/50 |
| 6,986,227 B1 * | 1/2006 | Gavin | ..................... | E02D 29/12 220/4.27 |
| 7,351,909 B1 * | 4/2008 | Harwood | ............. | H02G 3/0493 174/37 |
| 7,361,834 B1 * | 4/2008 | Trangsrud | ................ | H02G 3/14 174/66 |
| 7,574,831 B2 * | 8/2009 | Meyers | .................... | E02D 29/12 404/25 |
| 7,581,655 B1 * | 9/2009 | Trangsrud | ............. | H02G 3/185 174/50 |

(Continued)

*Primary Examiner* — Rodney Mintz
(74) *Attorney, Agent, or Firm* — McCarter & English, LLP

(57) ABSTRACT

The present disclosure provides an advantageous underground enclosure/assembly for housing electrical components. More particularly, the present disclosure provides an underground enclosure/assembly (e.g., handhole/pullbox assembly) that is configured to protect wiring connections and provide access to those connections for initial installation, and later for maintenance/alteration. The present disclosure provides for a cylindrical body and a frame with a lip feature to interface with the cylindrical body to enhance the durability and to assist in maintaining the circularity of the cylindrical body. The advantageous frame provides for a feature (e.g., a notch) to integrate fill materials with the frame. The frame further includes features for interfacing a cover.

19 Claims, 7 Drawing Sheets

(56) References Cited

U.S. PATENT DOCUMENTS

| | | | | |
|---|---|---|---|---|
| 7,627,992 B1* | 12/2009 | Gavin | ................... | E02D 29/12 |
| | | | | 174/39 |
| 7,862,729 B2* | 1/2011 | Stetson | ................ | E01C 11/227 |
| | | | | 210/164 |
| 2005/0189133 A1* | 9/2005 | Harwood | ................ | H02G 9/10 |
| | | | | 174/50 |
| 2005/0217882 A1* | 10/2005 | Rizzuto, Jr. | ............. | F16L 25/10 |
| | | | | 174/480 |
| 2018/0305888 A1* | 10/2018 | Bonell | ................ | E02D 29/121 |

* cited by examiner

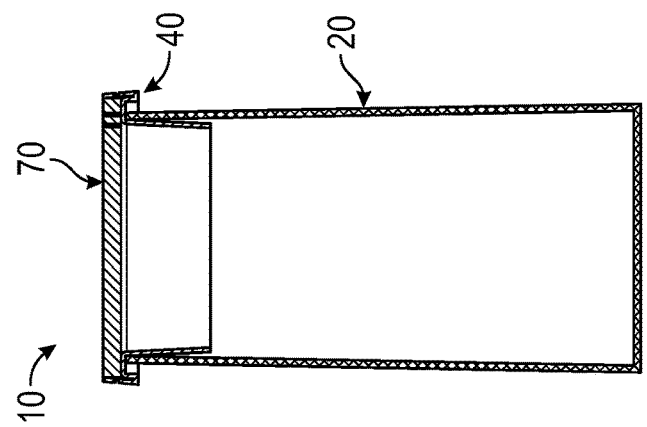
FIG. 1D
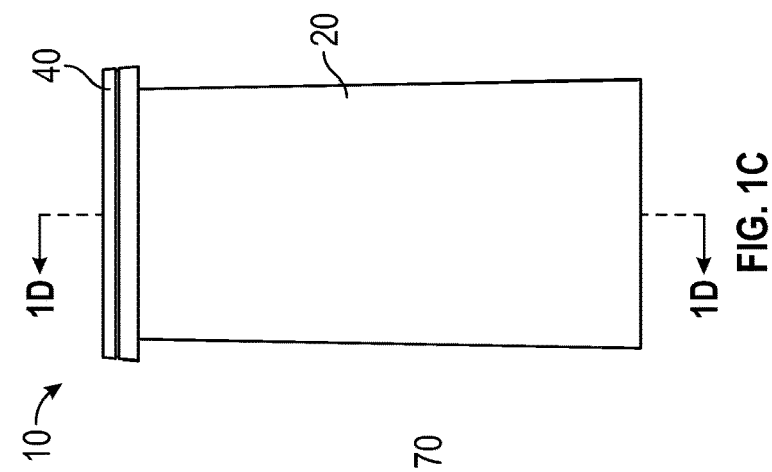
FIG. 1C
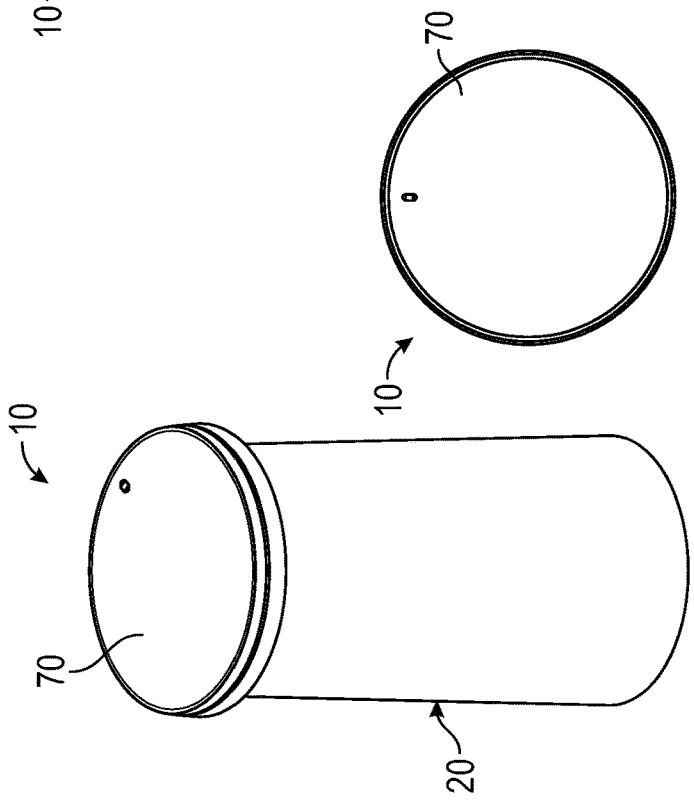
FIG. 1B
FIG. 1A

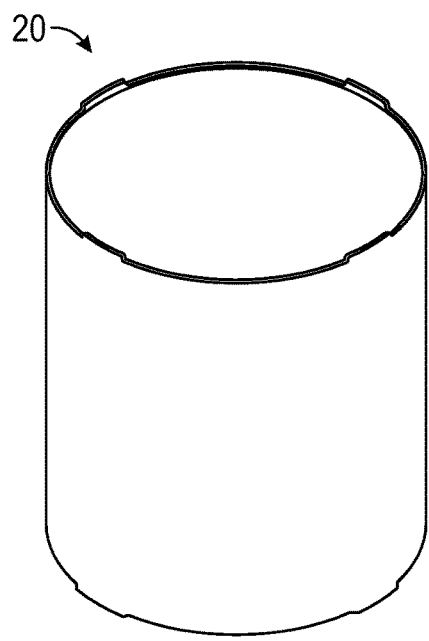
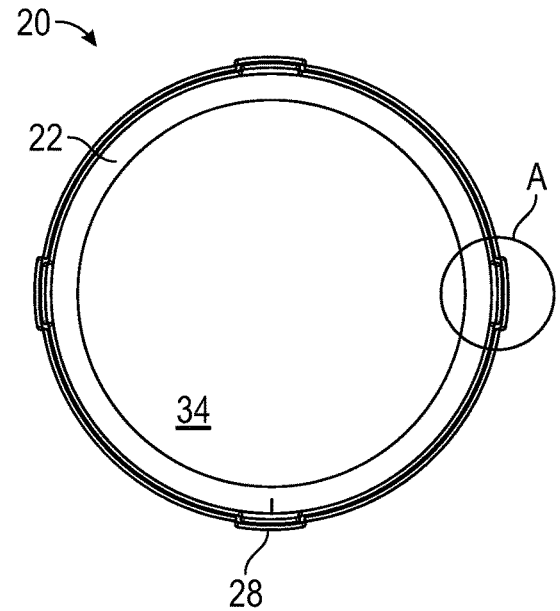
FIG. 2A  FIG. 2B
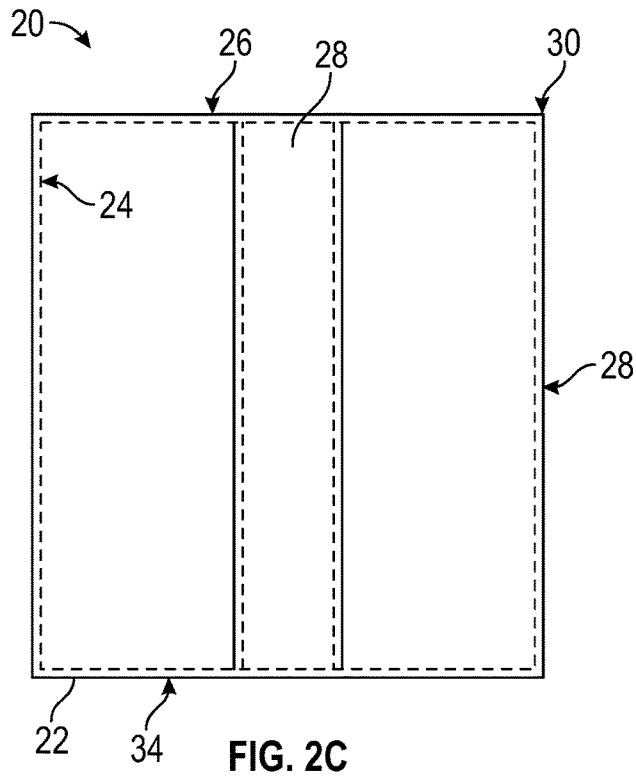
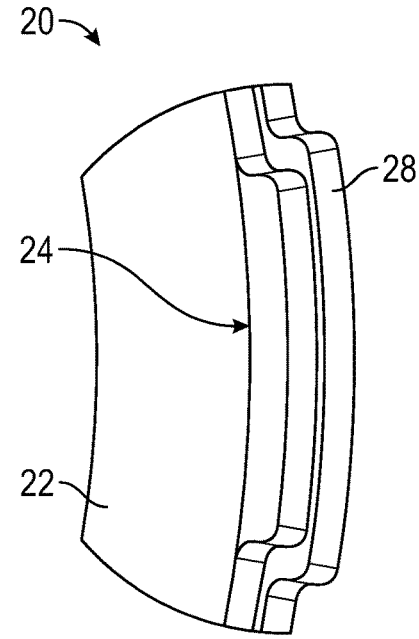
FIG. 2C  FIG. 2D

HANDHOLE ASSEMBLY

FIELD OF THE DISCLOSURE

The present disclosure generally relates to an advantageous underground enclosure or assembly for housing electrical components, and more particularly, to an enclosure/assembly (e.g., handhole or pullbox assembly) configured to protect wiring connections and to provide access to those connections for initial installation, and later for maintenance or alteration.

BACKGROUND OF THE DISCLOSURE

Traditionally, electric handholes and pullboxes have been used on or adjacent to highways or sidewalks and can be subject to being rolled over by vehicles. Therefore, the access covers for the handholes/pullboxes may have to withstand large weights without cracking, breaking, and/or bending/deforming. For example, when struck by snowplows and/or when run over by heavy vehicles. Further, covers fabricated from metal can be heavy and subject to rust. Metal access covers, when placed on a metal frame resting on top of the top of the handhole/pullbox, tend to freeze together such that the access cover cannot be easily removed. Further, because of the weight, it can be difficult for workers to remove the access cover.

Further, some handholes/pullboxes are made in one length and are not adjustable to fit different depth holes to reach wiring at different positions.

Thus, an interest exists for improved handhole assemblies and related methods of use. These and other inefficiencies and opportunities for improvement are addressed and/or overcome by the assemblies, systems and methods of the present disclosure.

SUMMARY OF THE DISCLOSURE

The present disclosure provides an advantageous underground enclosure or assembly for housing electrical components. More particularly, the present disclosure provides an underground enclosure/assembly (e.g., handhole or pullbox assembly) that is configured to protect wiring connections and provide access to those connections for initial installation, and later for maintenance or alteration. For example, the assemblies of the present disclosure can protect and provide access to electrical/fiber optic cabling/connections associated with semaphores, street lights, stop signals, and other devices that may be buried in the ground. As used herein, handhole assembly may be additionally referred to as a barrel assembly, a pullbox assembly, a junction box assembly, and any combination thereof.

An exemplary handhole assembly includes a body with a generally cylindrical shape. The disclosed cylindrical body may further include tapered walls wherein the diameter at the base is larger than the diameter at the top. The tapered walls may be associated with the inside and/or outside surface of the cylindrical body. The cylindrical body may further include support features (e.g., ribs) to enhance the durability and strength of the cylindrical body. The disclosed ribs may be fabricated with (or in close proximity to) a surface of the cylindrical body.

In exemplary embodiments, the handhole assembly further includes a frame for interfacing a cover with the cylindrical body. The disclosed frame may include a lip feature to enhance the durability of and to assist in maintaining the circularity of the cylindrical body. The disclosed frame may further include features (e.g., a notch) for integrating fill materials with the frame. Additionally, the disclosed frame may include a return for interaction with the inside surface of the cylindrical body. The return may be angled inward towards the longitudinal axis of the cylindrical body to ensure the cover remains parallel to the surface of the ground, despite instances when the cylindrical body is installed on an angle.

When placed in a hole, fill material disperses in and around the cylindrical body and frame to form an integrated assembly that will be difficult to pull up out of the ground, thereby resisting soil conditions and frost from raising the cylindrical body after it is placed in the ground. Tapering the side walls of the cylindrical body will further resist axial movement towards the surface of the ground.

The cylindrical body may further include a base with a concave portion and apertures to allow fill material (e.g., sand) to flow through the base to adjust the height of the cylindrical body in a hole. Specifically, a layer of sand or fill may be added to the inside portion of the base, and the cylindrical body may be lifted away from the bottom surface of the hole, thereby enabling the fill to exit through the apertures and spread along the bottom surface of the hole. Consequently, the height of the cylindrical body, and subsequently the handhole assembly, may be adjusted as a result of the additional fill material added to the bottom surface of the hole.

The handhole assembly may further include an extender to increase the height of the cylindrical body in comparison to a hole depth. The components of the handhole assembly (e.g., cylindrical body, frame, cover, extender) may be fabricated from plastic (e.g., polyethylene), fiberglass, and a combination thereof, as well as other high strength, lightweight materials.

The present disclosure also provides for a handhole assembly with a hollow cylindrical body including a base, a tapered side wall with a rim at the top, and a bottom wall, the cylindrical body having a larger diameter at the base than at the top for an inclined upward slope of the tapered side wall, wherein the top of the hollow cylindrical body is open ended; and a casting frame including a first hollow ring and a second hollow ring, wherein the first hollow ring is concentric with respect to the second hollow ring; the first hollow ring including a side wall with an outside diameter, a top edge, and a bottom surface; a lip cavity extending from the bottom surface of the first hollow ring towards the top edge, the lip cavity including a first lip wall, a second lip wall, and a lip cavity surface, the first lip wall and second lip wall extend from the lip cavity surface to form the lip cavity, wherein the first lip wall forms an outside diameter of the lip cavity and the second lip wall forms an inside diameter of the lip cavity; the second hollow ring extending from the bottom surface of the first hollow ring, the second hollow ring including a side wall with an outside diameter, and a bottom edge, wherein the outside diameter is smaller than the outside diameter formed by the first lip wall; wherein the casting frame is mounted with respect to the cylindrical body, the lip cavity of the casting frame is mounted with respect to the top edge of the cylindrical body and the first lip wall and the second lip wall extend past the top edge of the cylindrical body towards the base, and the second hollow ring extends within the cylindrical body towards the base.

The present disclosure also provides for a handhole assembly wherein the face of the lip cavity surface opposite the lip cavity forms a ledge with respect to the top edge of the casting frame.

The present disclosure also provides for a handhole assembly including a cover mounted with respect to the ledge of the casting frame.

The present disclosure also provides for a handhole assembly wherein the side wall of the second hollow ring is tapered inward, wherein the diameter of the bottom edge is smaller.

The present disclosure also provides for a handhole assembly wherein the second lip wall of the lip cavity abuts the side wall of the second hollow ring.

The present disclosure also provides for a handhole assembly wherein the distance from the lip cavity surface to the bottom edge of the second hollow ring is between about two inches and about six inches.

The present disclosure also provides for a handhole assembly wherein the side wall of the first hollow ring further includes a notch extending inward from the outside diameter, wherein the notch enables media interaction with the casting frame.

The present disclosure also provides for a handhole assembly wherein the taper of the side wall of the second hollow ring is between greater than zero degrees to about five degrees.

The present disclosure also provides for a handhole assembly wherein the cylindrical body further includes at least one rib feature mounted with respect to the side wall.

The present disclosure also provides for a handhole assembly wherein a plurality of bolt apertures through the hollow cylindrical body near the rim and wherein the side wall has at least one threaded insert embedded therein, and a plurality of bolt apertures through the second hollow ring of the casting frame which align with the bolt apertures in the side wall of the cylindrical body such that bolts passing therethrough secure the casting frame to the cylindrical body.

The present disclosure also provides for a handhole assembly wherein a gasket placed at the rim of the cylindrical body provides a watertight seal with the casting frame.

The present disclosure also provides for a handhole assembly wherein a gasket placed at the ledge of the casting frame body provides a watertight seal with the cover.

The present disclosure also provides for a handhole assembly wherein the bottom wall of the cylindrical body includes at least one appropriately sized aperture such that as the handhole containing a fill is pulled upward to adjust its position in a hole, fill passes from inside the handhole to under the handhole thereby adjusting the support level of the handhole.

The present disclosure also provides for a handhole assembly wherein the components are fabricated from polyethylene.

The present disclosure also provides for a handhole assembly including an extension mounted with respect to the casting frame and the cylindrical body, wherein the extension comprises a first ring portion, a second ring portion, and a ledge, the first ring portion with a outside diameter larger than the second ring portion which defines the ledge, the second ring portion is mounted with respect to the hollow portion of the cylindrical body and the ledge rests on the rim of the cylindrical body.

The present disclosure also provides for a handhole assembly wherein the first lip wall and the second lip wall extend perpendicularly from the lip cavity surface to form the lip cavity.

The present disclosure also provides for a handhole assembly wherein the first lip wall and the second lip wall angularly extend from the lip cavity surface to form the lip cavity.

The present disclosure also provides for a handhole assembly with a hollow cylindrical body including a base, a tapered side wall with a rim at the top and at least one rib mounted with respect thereto, and a bottom wall, the cylindrical body having a larger diameter at the base than at the top for an inclined upward slope of the tapered side wall, wherein the top of the hollow cylindrical body is open ended; and a casting frame including a first hollow ring and a second hollow ring, wherein the first hollow ring is concentric with respect to the second hollow ring; the first hollow ring including a side wall with an outside diameter, a top edge, and a bottom surface; a lip cavity extending from the bottom surface towards the top edge, the lip cavity including a first lip wall, a second lip wall, and a lip cavity surface, the first lip wall and second lip wall extend from the lip cavity surface to form the lip cavity, wherein the first lip wall forms an outside diameter of the lip cavity and the second wall forms an inside diameter of the lip cavity; second lip wall extending beyond the bottom surface to form a side wall of the second hollow ring, the side wall has an outside diameter and a bottom edge, wherein the side wall is inwardly tapered; wherein the casting frame is mounted with respect to the cylindrical body, the lip cavity of the casting frame is mounted with respect to the top edge of the cylindrical body and the first lip wall and the second lip wall extend past the top edge of the cylindrical body towards the base, and the second hollow ring extends within the cylindrical body towards the base; and wherein the side wall of the first hollow ring includes a notch perpendicularly cut into the side wall.

Any combination or permutation of embodiments is envisioned. Additional advantageous features, functions and applications of the disclosed systems, methods and assemblies of the present disclosure will be apparent from the description which follows, particularly when read in conjunction with the appended figures. All references listed in this disclosure are hereby incorporated by reference in their entireties.

BRIEF DESCRIPTION OF THE FIGURES

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure.

Figure 3A:
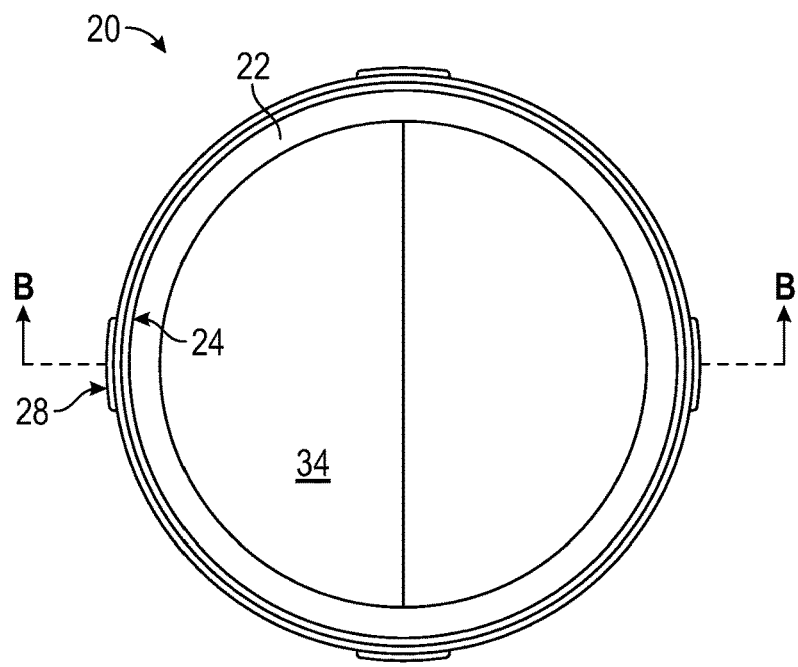
Figure 3B:
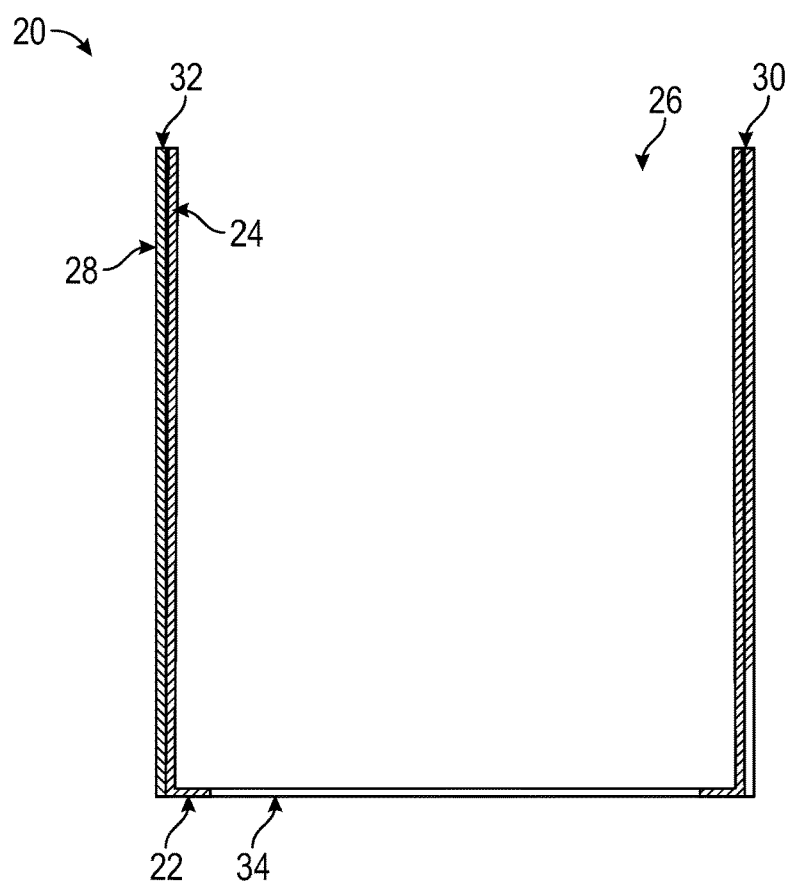
Figure 4C:
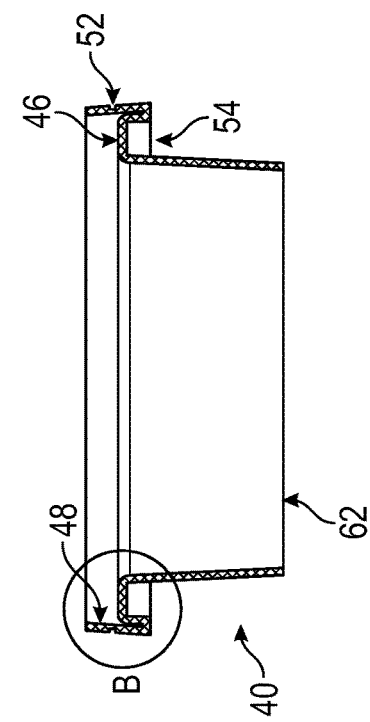
Figure 4D:
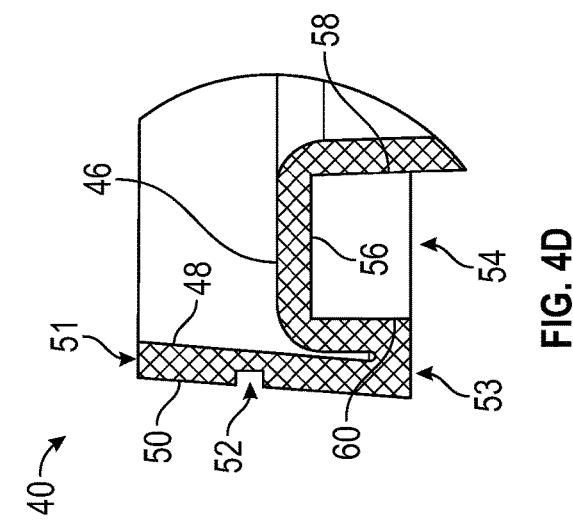
Figure 4A:
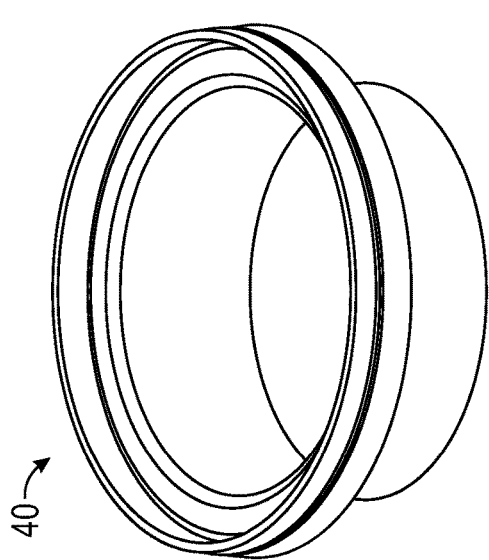
Figure 4B:
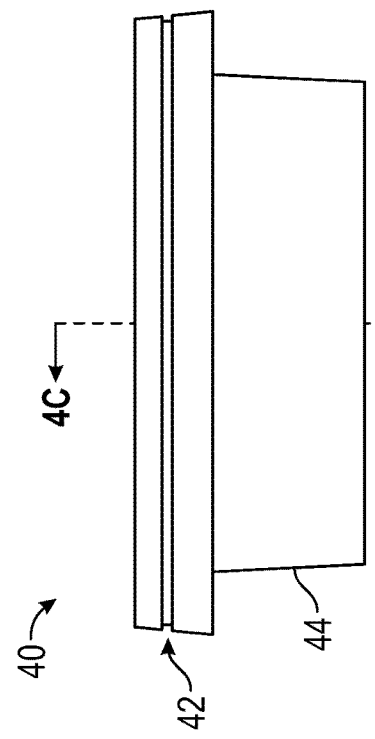
Figure 5A:
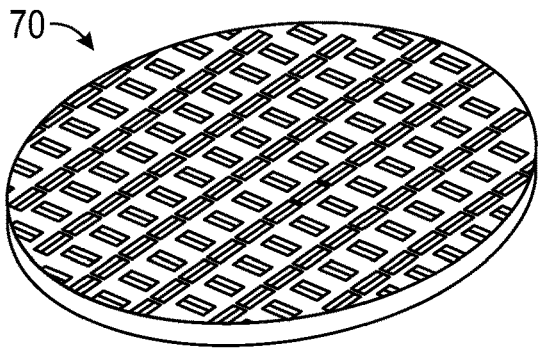
Figure 5B:
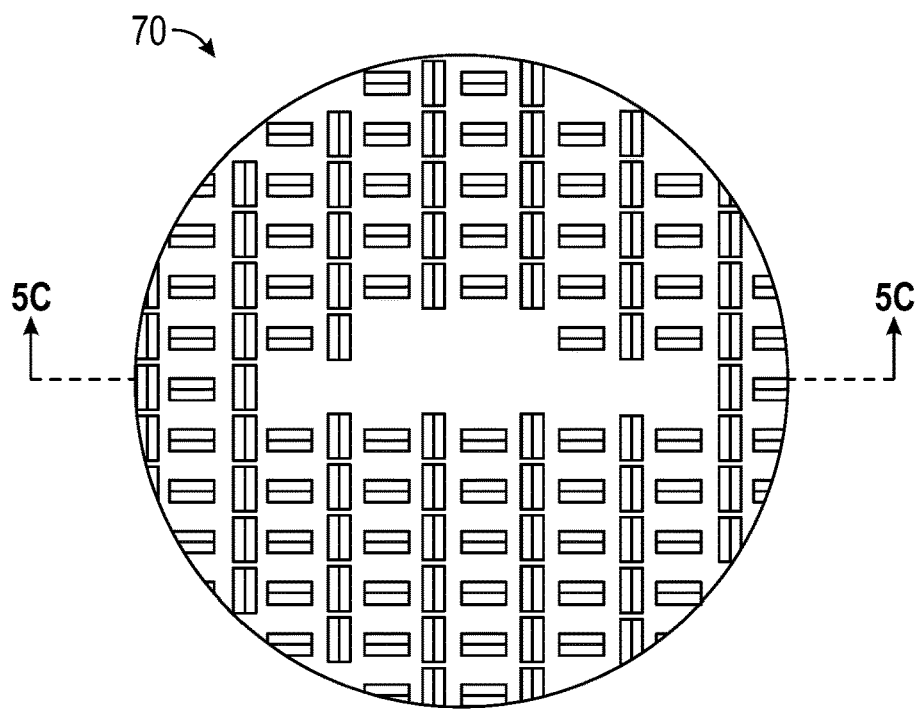
Figure 5C:
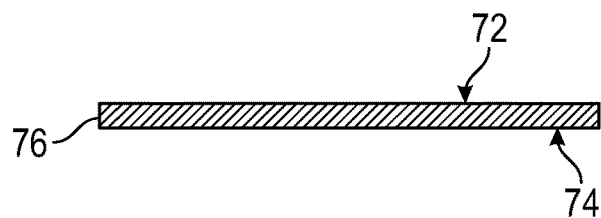
Figure 6B:
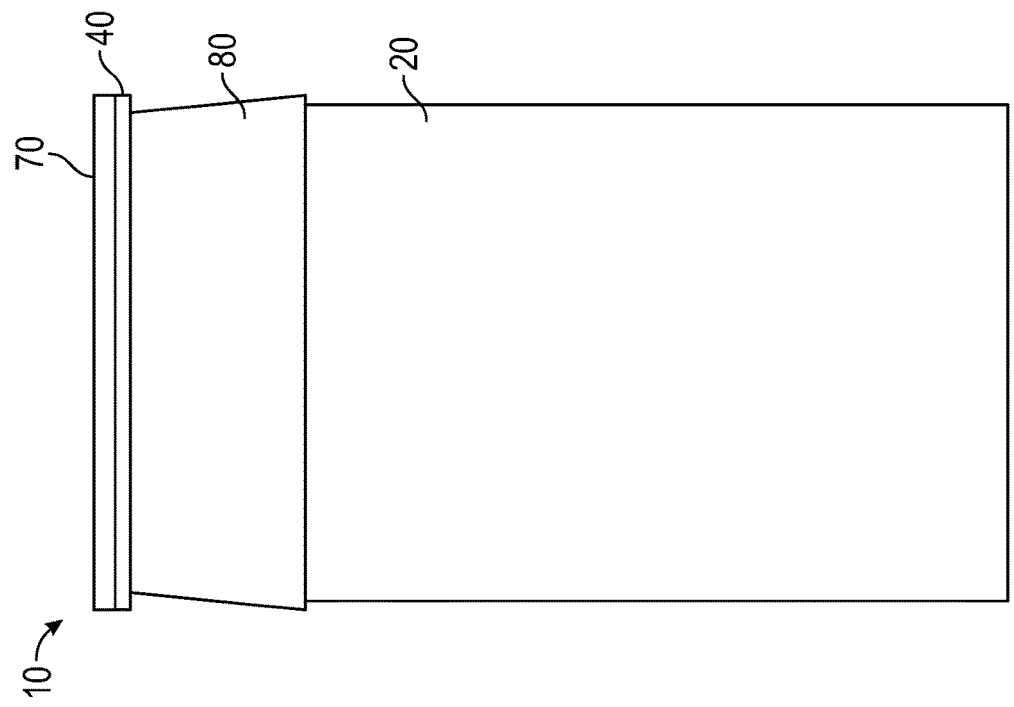
Figure 6A:
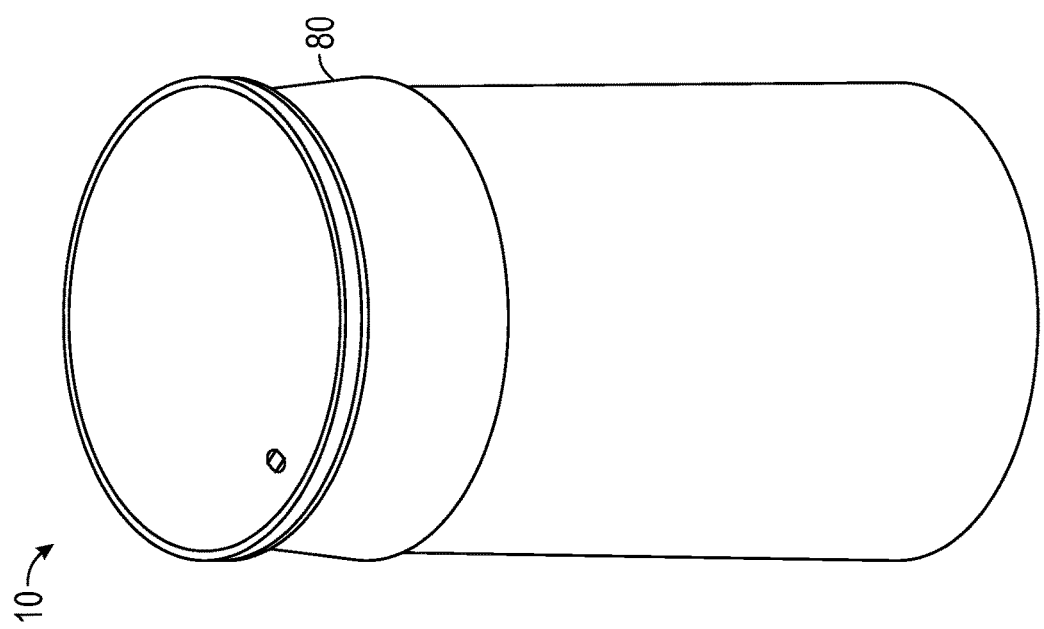
Figure 7A:
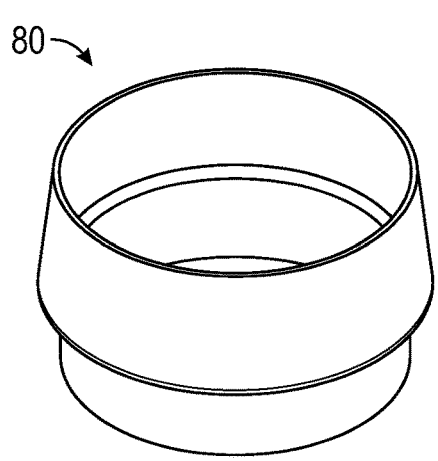
Figure 7B:
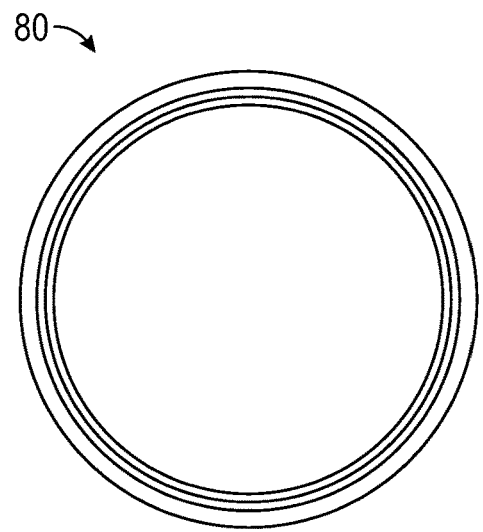
Figure 7C:
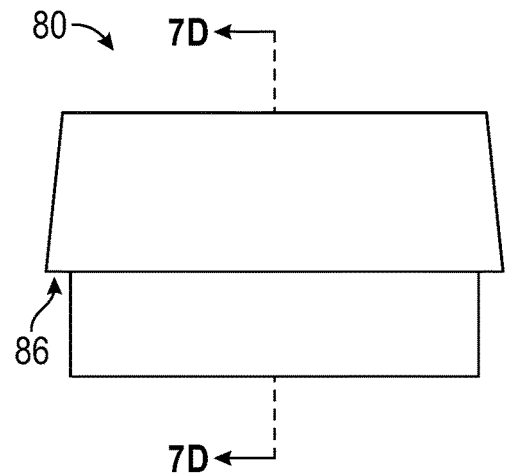
Figure 7D:
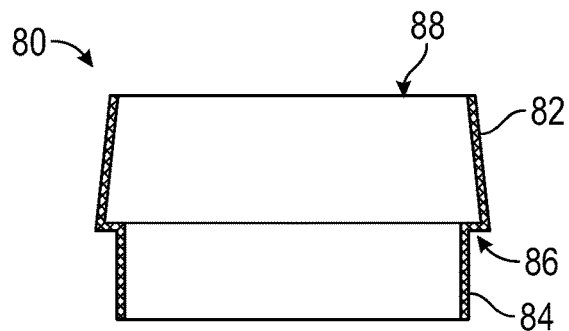

To assist those of ordinary skill in the art in making and using the disclosed assemblies, systems and methods, reference is made to the appended figures, wherein:

FIG. 1A schematically depicts a perspective view of an exemplary handhole assembly according to the present disclosure;

FIG. 1B schematically depicts a top view of an exemplary handhole assembly according to the present disclosure;

FIG. 1C schematically depicts a side view of an exemplary handhole assembly according to the present disclosure;

FIG. 1D schematically depicts a cross-section view of an exemplary handhole assembly according to the present disclosure;

FIG. 2A schematically depicts a perspective view of an exemplary cylindrical body according to the present disclosure;

FIG. 2B schematically depicts a top view of an exemplary cylindrical body according to the present disclosure;

FIG. 2C schematically depicts a side view of an exemplary cylindrical body according to the present disclosure;

FIG. 2D schematically depicts a detailed view based on the top view of an exemplary cylindrical body according to the present disclosure;

FIG. 3A schematically depicts a top view of an exemplary cylindrical body according to the present disclosure;

FIG. 3B schematically depicts a cross-section view of an exemplary cylindrical body according to the present disclosure;

FIG. 4A schematically depicts a perspective view of an exemplary casting frame according to the present disclosure;

FIG. 4B schematically depicts a top view of an exemplary casting frame according to the present disclosure;

FIG. 4C schematically depicts a cross-section view of an exemplary casting frame according to the present disclosure;

FIG. 4D schematically depicts a detailed view based on the cross-section view of an exemplary casting frame according to the present disclosure;

FIG. 5A schematically depicts a perspective view of an exemplary cover according to the present disclosure;

FIG. 5B schematically depicts a top view of an exemplary cover according to the present disclosure;

FIG. 5C schematically depicts a cross-section view of an exemplary cover according to the present disclosure;

FIG. 6A schematically depicts a perspective view of an exemplary handhole assembly according to the present disclosure;

FIG. 6B schematically depicts a side view of an exemplary handhole assembly according to the present disclosure;

FIG. 7A schematically depicts a perspective view of an exemplary extension according to the present disclosure;

FIG. 7B schematically depicts a top view of an exemplary extension according to the present disclosure;

FIG. 7C schematically depicts a side view of an exemplary extension according to the present disclosure; and FIG. 7D schematically depicts a cross-section view of an exemplary extension according to the present disclosure.

DETAILED DESCRIPTION OF THE DISCLOSURE

The exemplary embodiments disclosed herein are illustrative of advantageous underground enclosures or assemblies (e.g., handhole or pullbox assemblies), and systems of the present disclosure and methods/techniques thereof. It should be understood, however, that the disclosed embodiments are merely exemplary of the present disclosure, which may be embodied in various forms. Therefore, details disclosed herein with reference to exemplary assemblies/fabrication methods and associated processes/techniques of assembly and use are not to be interpreted as limiting, but merely as the basis for teaching one skilled in the art how to make and use the advantageous assemblies/systems (e.g., handhole assemblies) and/or alternative assemblies of the present disclosure.

The exemplary embodiments disclosed herein are illustrative of an advantageous underground enclosure/assembly for housing electrical components. More particularly, the present disclosure provides an underground enclosure/assembly (e.g., handhole assembly) configured to protect wiring connections and provide access to those connections for initial installation, and later for maintenance or alteration. An exemplary handhole assembly includes a cylindrical body, a casting frame, a cover, and optionally at least one extension. The casting frame is associated with the cylindrical body and the cover is associated with the casting frame, as described in more detail below.

In an exemplary embodiment, a casting frame is fixedly attached to the cylindrical body and the cover is fixedly attached to the casting frame so that the entire handhole assembly is integrally connected such that if one portion of the handhole assembly moves, the entire handhold assembly moves. If an optional extension is used, the extension is associated with the cylindrical body and the casting frame. The extension may be fixedly attached to the cylindrical body and the casting frame. The attachment of the disclosed components may be accomplished through fasteners, features incorporated within the disclosed components, adhesives, and a combination thereof.

Some related assemblies and systems in this general field are described and disclosed in the following disclosures: (i) U.S. Pat. No. 7,581,655 entitled "Pullbox Assembly," which issued on Sep. 1, 2009; (ii) U.S. Pat. No. 7,361,834 entitled "Electric Handhole/Pullbox Access Cover," which issued on Apr. 22, 2008; and (iii) U.S. Pat. No. 6,881,899 entitled "Pullbox Assembly," which issued on Apr. 19, 2005. The entire contents of the foregoing references are incorporated herein by reference.

Referring now to the drawings, like parts are marked throughout the specification and drawings with the same reference numerals, respectively. Drawing figures are not necessarily to scale and in certain views, parts may have been exaggerated for purposes of clarity.

FIGS. 1A-1D schematically depict exemplary handhole assembly 10, which includes cylindrical body 20, casting frame 40, and cover 70. As illustrated by cross-section A-A, FIG. 1D, casting frame 40 captures edge 30 of cylindrical body 20 (FIG. 2C) to assist in maintaining the circularity of cylindrical body 20 and to further enable cover 70 to remain parallel with the slope of the ground. To further discuss handhole assembly 10, reference is made to the individual components illustrated in FIGS. 2-5, in view of FIGS. 1A-1D.

Cylindrical body 20, illustrated in FIGS. 2A-2D and 3A-3B, includes base 22, sidewall 24, and opening 26. Sidewall 24 may extend perpendicularly from base 22, parallel to the longitudinal axis of cylindrical body 20, to form opening 26 that is of equal diameter to base 22. However, sidewall 24 may be tapered from base 22 such that opening 26 has a different diameter than base 22. In particular, sidewall 24 may be tapered inward towards the longitudinal axis of cylindrical body 20 such that the diameter of base 22 is greater than the diameter of opening 26. The taper allows for fill added after cylindrical body 20 is placed in a hole to be added all around cylindrical body 20 from the base to the top. The taper thus makes it more difficult for frost or soil conditions to lift cylindrical body 20 out of the hole as the fill has to be displaced to lift cylindrical body 20.

Cylindrical body 20 may have a plurality of eyebolts associated with sidewall 24 of cylindrical body 20 to facilitate lifting cylinder body 20. In an exemplary embodiment, cylindrical body 20 may utilize three eyebolts. The placement of the eyebolts may vary. The eyebolts may be used not only for lifting cylindrical body 20, but also for holding the wires or cables inside of body 20 at desired heights.

Cylindrical body 20 may include a solid base or an open base with a base ridge 22 on the circumference, as illustrated. Exemplary base ridge/ledge 22 allows handhole assembly 10 to rest on the ground so that it is stable at the base 22. The open area 34 at the bottom allows water to enter and leave handhole assembly 10. On installation, if the excavated hole is too deep, material such as sand or gravel may be added to the hole and handhole assembly 10 may be placed in the hole and tapped down into place, and material may be displaced around ledge 22 until handhole assembly 10 is stably placed at the right height. If the height needs to be raised, it is easy to lift cylindrical body 20 up since the fill material may easily escape through opening 34 located within ledge 22. New fill may then be added to raise handhole assembly 10, and handhole assembly 10 may then be reinserted into the excavated hole and tapped down into place. Base opening 34 may be concentric with base 22 and/or top opening 26.

Cylindrical body 20 may further include at least one support material 28 directly/indirectly in relation to sidewall 24. Support material (e.g., a rib 28) may extend at least partially along some distance of sidewall 24. In an exemplary embodiment, support material may include a vertical rib 28 that at least partially extends perpendicularly from base 22. As illustrated in FIGS. 2C and 3B, rib 28 perpendicularly extends from base 22 to top edge 30. In the instance where sidewall 24 is inwardly tapered and rib 28 is perpendicular, gap 32 is created between sidewall 24 and rib 28 such that gap 32 has the largest width close to opening 26 and tapers to a point near base 22. In operation, when casting frame 40 or optional extension 80 is inserted into opening 26 of cylindrical body 20, sidewall 24 may flex so as to apply a spring force against either casting frame 40 or optional extension 80. In such case, rib 28 would provide the boundary for the flexing of sidewall 24. In yet another embodiment, rib 28 may at least partially extend circumferentially around cylindrical body 20 to provide additional support, similar to rib 28.

At an installation site, handhole assembly 10 may be utilized to protect wiring connections and provide access to those connections for initial installation, and later for maintenance or alterations. Typically, wiring for semaphores, street lights, and other uses are connected inside of a protective enclosure buried in the ground with the wires to stop signals, street lights or other devices buried in the ground meeting in handhold assembly 10. Holes (not shown) are drilled in the side of cylindrical body 20 to let wires inside of handhole assembly 10. The wires are then connected to each other or to equipment in handhole assembly 10. For waterproof or moisture proof handhole assemblies 10, the wires and cylindrical body 20 may have a compound sealant applied to prevent leakage. Further, gaskets may be used between cover 70 and casting frame 40 or optionally extension 80. Further, if optional extension 80 is used, a gasket may be used between extension 80 and cylindrical body 20.

Casting frame 40, illustrated in FIGS. 4A-4D, includes top ring 42 and concentrically positioned bottom ring 44 (e.g., return 44). Exemplary top ring 42 further includes ledge 46, for engagement with cover 70; notch 52; and lip cavity 54. In assembly, return 44 is concentrically positioned in relation to opening 26 of cylindrical body 20 and lowered into body 20 until lip cavity surface 56 of frame 40 is in close proximity to edge 30 of cylindrical body 20. As previously stated, it is a function of frame 40 to enhance the durability and to assist in maintaining the circularity of the cylindrical body 20.

Return 44 may be inserted into cylindrical body 20 through opening 26 until lip cavity surface 56 at least partially directly/indirectly contacts edge 30. In the case where an extender 80 is used, return 44 may be inserted into extender 80 until lip cavity surface 56 at least partially directly/indirectly contacts edge 88 (FIG. 7D). Inside lip wall 58 and outside lip wall 60 combine to create lip cavity 54, which is further defined by lip cavity surface 56. Inside lip wall 58 and outside lip wall 60 extend from lip cavity surface 56 to define cavity 54. Inside lip 58 and outside lip 60 may be parallel to each other or may be angled opposite each other. Inside lip 58 and outside lip 60 may further extend perpendicularly from lip cavity surface 56. Inside lip 58 and outside lip 60 ensure that frame 40 cannot translationally move such that frame 40 is no longer fully covering opening 26 of cylindrical body 20. The width of lip cavity 54 may be similar to the width of edge 30 or may be larger than the width of edge 30. As explained below, it is advantageous for lip cavity 54 to be at least slightly larger than edge 30.

Top ring 42 includes side wall 50 with an outside diameter, top edge 51, and bottom surface 53. Lip cavity 54 extends from bottom surface 53 of first hollow ring 42 towards top edge 51, lip cavity 54 includes outside lip wall 60, inside wall 58, and lip cavity surface 56, outside lip wall 60 and inside lip wall 58 extend from lip cavity surface 56 to form lip cavity 54. Outside lip wall 60 forms an outside diameter of lip cavity 54 and inside lip wall 58 forms an inside diameter of lip cavity 54.

Return 44 may be inwardly tapered such that the diameter of return 44 is larger at sections closer to top ring 42. Tapered return 44 enables frame 40, and subsequently cover 70, to remain parallel to the surface of the ground, despite instances where cylindrical body 20 is installed on an angle (e.g., slope of street, slope of concrete pad for handicap entrance, among others). In the event cylindrical body 20 is installed on an angle, a portion of frame 40 may be raised to a desired height. Once the desired height is achieved, frame 40 may be stabilized to ensure it remains in the desired position. Stabilization of frame 40 may be accomplished by fasteners, blocks, among other methods.

In an exemplary embodiment, return 44 may have an angle ranging from about zero degrees to about five degrees and a height of about two inches to about six inches. Of note, the provided dimensions are merely illustrative to assist a person skilled in the art and are not intended to be limiting. In one example, since the average slope of a street on a pedestrian crosswalk is three to four degrees, a five degree return 44 would have sufficient room within cylindrical body 20 to angle frame 40 such that ledge 46 is parallel to the slope of a street on a pedestrian crosswalk, a difficulty (if not impossibility) with perpendicular returns. It is advantageous for the width of lip cavity 54 to be at least partially larger than edge 30 so as to ensure frame 40 may be angled with respect to cylindrical body 20.

Top ring 42 further includes side wall/surface 50 which may be substantially perpendicular to ledge 46. In another example, surface 50 may be angled in relation to ledge 46. Located along surface 50 is notch 52. In an exemplary embodiment, notch 52 is perpendicular to surface 50, which is perpendicular to ledge 46. Notch 52 enables media (e.g., concrete, asphalt, resin, and a combination thereof) to capture frame 40 and restrict movement within the ground. Specifically, media would at least partially fill within notch 52.

In yet another embodiment, a bolt may pass through a bolt aperture (not shown) in return 44 and a bolt aperture (not shown) in cylindrical body 20 secures cylindrical body 20 to casting frame 40. Casting frame 40 may be molded from a ductile iron, cast iron or different types of plastic material. Exemplary cylindrical body 20 can be molded from a polyethylene or plastic material or the like, although the present disclosure is not limited thereto.

Casting frame 40 may have a flange (not shown) optionally with bolt apertures (not shown) for engaging cover 70, which may have bolt apertures for securing cover 70 to casting frame 40 with bolts. Casting frame 40 may alternatively have bolt arms with bolt apertures for securing cover 70 by means of bolts though bolt apertures. The embodiment of frame 40 with flange is used in conjunction with moisture and water sealing gaskets providing a seal between cover 70 and frame 40. Similarly, a gasket may be used for a moisture or water-sealing embodiment between frame 40 and cylindrical body 20.

Ledge 46 of frame 40 may capture bottom surface 74 of cover 70 (FIG. 5C). Edge 76 may be in close proximity to vertical surface 50 of frame 40. The diameter of ledge 46 may be larger than the diameter of cover 70. Cover 70 may have a diameter larger than opening 62 of frame 40 to ensure cover 70 has sufficient contact with ledge 46. Opening 62 provides access through frame 40 into cylindrical body 20. Top ring 42 may also include inner side surface 48. The edge 76 of cover 70 may be in close proximity to inner side surface 48 of top ring 42. In an exemplary embodiment, the diameter of ledge 46 (e.g., the diameter of inner side surface 48) is about 0.5 inches greater than the diameter of cover 70.

Cover 70 may be fabricated from a plastic, fiberglass or some other lightweight, easy-to-lift material. Cover 70 may be thicker than iron covers. Cover 70 may have a bolt recess portion so that the bolts do not stick up over the cover and provide a hazard for traffic passing over cover 70. Cover 70, casting frame 40 and cylindrical body 20 have been tested to ANSI CODE 77 requirements that exceed tier 15.

Cover 70 may have a tapered outer diameter to allow for easier placement in casting frame 40. Cover 70 may also have pry slots for aid in lifting cover 70 off of casting frame 40. Exterior surface 72 of cover 70 may also have a recessed portion for insertion of a nameplate to identify the equipment inside of the handhole assembly 10. For example, the label may state TMS (i.e., Traffic Maintenance Signals) or it may state Lighting or Signals. Having to stock only one set of covers 70 reduces inventory costs over having separately labeled covers with the labels molded into the covers. Different nameplates may be stored at low cost. The nameplates may be secured to covers 70 in numerous ways including bolting and gluing. Cover 70 may also have two lifting handles at 180 degrees from each other along the same line as the pry slots.

In an alternative embodiment for a handhole assembly 10 of a different height, as depicted in FIGS. 6A-6B, extension 80 may be used to add to the height of handhole assembly 10, thereby enabling handhole assembly 10 to fit into a hole which is deeper to get down to the level of the wires buried in the ground. Extension 80, as further illustrated in FIGS. 7A-7D, includes upper diameter ring portion 82 with a first diameter and lower diameter ring portion 84 with a second diameter, the two diameter ring portions 82, 84 may be integral with each other to form ledge portion 86 at the junction. Ledge portion 86 is configured to rest on edge 30 of cylindrical body 20 (FIG. 2C). Lower diameter portion 84 nests within cylindrical body 20, and edge 88 of upper diameter portion 82 may support casting frame 40 with lip cavity 54, as similarly explained above with reference to FIGS. 1A-1D and 4A-4D. Although lower diameter portion 84 is depicted as cylindrical, lower diameter portion 84 may also be tapered, as similarly described above in relation to return 44 of casting frame 40.

Bolt apertures (not shown) in lower diameter portion 84 of extension 80 may align with bolt apertures (not shown) in cylindrical body 20 to optionally allow extension 80 to be secured by bolts to cylindrical body 20. Upper diameter ring portion 82 may be secured to casting frame 40 by bolt apertures aligning with bolt apertures of cylindrical body 20. If a moisture or waterproof connection is desired, a gasket may be installed between casting frame 40 and extension 80, and an additional gasket may be installed between extension 80 and cylindrical body 20. In some embodiments more than one extension 80 may be used.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A handhole assembly comprising:
    a hollow cylindrical body including a base, a tapered side wall with a rim at the top, and a bottom wall, the cylindrical body having a larger diameter at the base than at the top for an inclined upward slope of the tapered side wall, wherein the top of the hollow cylindrical body is open ended; and
    a casting frame including a first hollow ring and a second hollow ring, wherein the first hollow ring is concentric with respect to the second hollow ring, and the first hollow ring includes a side wall with an outside diameter, a top edge, and a bottom surface;
    a lip cavity extending from the bottom surface of the first hollow ring towards the top edge, the lip cavity including a first lip wall, a second lip wall, and a lip cavity surface, the first lip wall and second lip wall extend from the lip cavity surface to form the lip cavity, wherein the first lip wall forms an outside diameter of the lip cavity and the second lip wall forms an inside diameter of the lip cavity;
    wherein the second hollow ring extends from the bottom surface of the first hollow ring, the second hollow ring including a side wall with an outside diameter, and a bottom edge, and the outside diameter is smaller than the outside diameter formed by the first lip wall;
    wherein the casting frame is mounted with respect to the cylindrical body, the lip cavity of the casting frame is mounted with respect to the top edge of the cylindrical body and the first lip wall and the second lip wall extend past the top edge of the cylindrical body towards the base, and the second hollow ring extends within the cylindrical body towards the base;
wherein the side wall of the first hollow ring further includes a notch extending inward from the outside diameter, wherein the notch enables media interaction with the casting frame.

2. The handhole assembly of claim 1, wherein the second lip wall of the lip cavity abuts the side wall of the second hollow ring.

3. The handhole assembly of claim 1, wherein the distance from the bottom surface of the first hollow ring to the bottom edge of the second hollow ring is between about two inches to about six inches.

4. The handhole assembly of claim 1, wherein the cylindrical body further comprises at least one rib feature mounted with respect to the side wall.

5. The handhole assembly of claim 1 further comprising a plurality of bolt apertures through the hollow cylindrical body proximal the rim and wherein the side wall has at least one threaded insert embedded therein, and a plurality of bolt apertures through the second hollow ring of the casting frame which align with the bolt apertures in the side wall of the cylindrical body such that bolts passing therethrough secure the casting frame to the cylindrical body.

6. The handhole assembly of claim 1 further comprising a gasket positioned at the rim of the cylindrical body, the gasket configured to provide a watertight seal with the casting frame.

7. The handhole assembly of claim 1, wherein the bottom wall of the cylindrical body further comprises at least one sized aperture configured so that as the cylindrical body containing a fill is pulled upward to adjust a position of the cylindrical body in a hole, fill passes from inside the cylindrical body to under the cylindrical body thereby adjusting a support level of the handhole assembly.

8. The handhole assembly of claim 1, wherein the hollow cylindrical body and the casting frame are fabricated from polyethylene.

9. The handhole assembly of claim 1, further comprising an extension mounted with respect to the casting frame and the cylindrical body, wherein the extension includes a first ring portion, a second ring portion, and a ledge, the first ring portion with an outside diameter larger than the second ring portion, the first ring portion is mounted concentrically with respect to the second ring portion, with a junction of the first ring portion and the second ring portion defining the ledge, the second ring portion is mounted with respect to the hollow portion of the cylindrical body and the ledge rests on the rim of the cylindrical body.

10. The handhole assembly of claim 1, wherein the first lip wall and the second lip wall extend perpendicularly from the lip cavity surface to form the lip cavity.

11. The handhole assembly of claim 1, wherein the first lip wall and the second lip wall angularly extend from the lip cavity surface to form the lip cavity.

12. The handhole assembly of claim 1, wherein the side wall of the second hollow ring is tapered inward and downward toward the bottom edge of the second hollow ring, the second hollow ring having a larger diameter proximal to the bottom surface of the first hollow ring than at the bottom edge of the second hollow ring.

13. The handhole assembly of claim 12, wherein the taper of the side wall of the second hollow ring is between greater than zero degrees and about five degrees.

14. The handhole assembly of claim 1 further comprising a ledge extending perpendicular from the side wall of the first hollow ring.

15. The handhole assembly of claim 14 further comprising a cover, wherein the cover is mounted with respect to the ledge of the casting frame.

16. The handhole assembly of claim 15 further comprising a gasket placed at the ledge of the casting frame body provides a watertight seal with the cover.

17. A handhole assembly comprising:
a hollow cylindrical body including a base, a tapered side wall with a rim at the top and at least one rib mounted with respect thereto, and a bottom wall, the cylindrical body having a larger diameter at the base than at the top for an inclined upward slope of the tapered side wall, wherein the top of the hollow cylindrical body is open ended;
a casting frame including a first hollow ring and a second hollow ring, wherein the first hollow ring is concentric with respect to the second hollow ring, and the first hollow ring includes a side wall with an outside diameter, a top edge, and a bottom surface; and
a lip cavity extending from the bottom surface of the first hollow ring towards the top edge, the lip cavity including a first lip wall, a second lip wall, and a lip cavity surface, the first lip wall and second lip wall extend from the lip cavity surface to form the lip cavity, wherein the first lip wall forms an outside diameter of the lip cavity and the second lip wall forms an inside diameter of the lip cavity;
wherein the second lip wall extends beyond the bottom surface to form a side wall of the second hollow ring, the side wall of the second hollow ring having an outside diameter and a bottom edge, wherein the side wall of the second hollow ring is inwardly tapered;
wherein the casting frame is mounted with respect to the cylindrical body, the lip cavity of the casting frame is mounted with respect to the top edge of the cylindrical body and the first lip wall and the second lip wall extend past the top edge of the cylindrical body towards the base, and the second hollow ring extends within the cylindrical body towards the base; and
wherein the side wall of the first hollow ring includes a notch perpendicularly cut into the side wall of the first hollow ring.

18. The handhole assembly of claim 17, wherein the bottom wall of the cylindrical body further comprises at least one sized aperture configured so that as the cylindrical body containing a fill is pulled upward to adjust a position of the cylindrical body in a hole, fill passes from inside the cylindrical body to under the cylindrical body thereby adjusting a support level of the handhole assembly.

19. The handhole assembly of claim 17 further comprising an extension mounted with respect to the casting frame and the cylindrical body, wherein the extension includes a first ring portion, a second ring portion, and a ledge, the first ring portion with an outside diameter larger than the second ring portion, the first ring portion is mounted concentrically with respect to the second ring portion, with a junction of the first ring portion and the second ring portion defining the ledge, the second ring portion is mounted with respect to the hollow portion of the cylindrical body and the ledge rests on the rim of the cylindrical body.

* * * * *